United States Patent Office

3,356,627
Patented Dec. 5, 1967

3,356,627
AQUEOUS BLENDS OF TWO WATER-INSOLUBLE POLYMERS, ONE OF WHICH HAS 1 TO 15% OF A MONOMER CONTAINING AN ALCOHOLIC HYDROXYL, AMINO, AMIDO OR UREIDO GROUP
Joseph David Scott, Philadelphia, Pa., assignor to Rohm & Haas Company, Philadelphia, Pa., a corporation of Delaware
No Drawing. Filed June 17, 1963, Ser. No. 288,528
22 Claims. (Cl. 260—29.6)

The present invention is concerned with aqueous dispersions of addition polymers which are adapted for use as coating and impregnating compositions and which are characterized by outstanding properties including improved adhesion to various substrates, improved penetration of, and/or adhesion to, porous substrates, such as wood, textiles, paper, non-woven fabrics, masonry or plaster having a powdery or chalky surface; wood or other rigid susbtrate partly or wholly covered with a weathered or chalky surfaced paint, especially oil-paint or alkyd-type paint, metal surfaces, either bright, partly or wholly primed, or corroded over part or all of their exposed areas including rusty iron from which only the loose rust has been removed, as by a wire brushing or other mechanical action, corroded copper, brass, aluminum or magnesium, improved resistance to the collection of dust and dirt, improved flow and leveling, improved hardness, toughness, and resistance to abrasion, improved wet-adhesion as contrasted with the adhesion mentioned above of the type involving the permanent adhesion of the dried and/or cured film on the substrate, and various combinations of these properties with each other. The present invention is concerned with both clear compositions as well as aqueous base paints containing pigments, dyes and/or other coloring material, adapted for both interior and exterior uses.

The present invention is concerned with the modification of aqueous addition polymer dispersions, generally obtained most conveniently by direct emulsion polymerization. The most important of these dispersions used in making water-based paints are polymers, including homopolymers and copolymers, of: (1) vinyl esters of an aliphatic acid having 1 to 18 carbon atoms, especially vinyl acetate; (2) acrylic acid esters and methacrylic acid esters of an alcohol having 1 to 18 carbon atoms, especially methyl acrylate, ethyl acrylate, butyl acrylate, 2-ethylhexyl acrylate, methyl methacrylate, ethyl methacrylate and butyl methacrylate; and (3) mono- and di-ethylenically unsaturated hydrocarbons, such as ethylene, isobutylene, styrene, and aliphatic dienes, such as butadiene, isoprene, and chloroprene.

Poly(vinyl acetate) and copolymers of vinyl acetate with one or more of the following monomers: vinyl chloride, vinylidene chloride, styrene, vinyltoluene, acrylonitrile, methacrylonitrile, one or two of the acrylic and methacrylic acid esters mentioned above are well-known as the film-forming component of aqueous base paints. Similarly copolymers of one or more of the acrylic or methacrylic acid esters mentioned above with one or more of the following monomers: vinyl acetate, vinyl chloride, vinylidene chloride, styrene, vinyltoluene, acrylonitrile, and methacrylonitrile are also more or less conventionally employed in aqueous base paints. Homopolymers of ethylene, isobutylene, and styrene, and copolymers of one or more of these hydrocarbons with one or more esters, nitriles or amides of acrylic acid or of methacrylic acid or with vinyl esters, such as vinyl acetate and vinyl chloride, or with vinylidene chloride are also used. The diene polymers are generally used in aqueous base paints in the form of copolymers with one or more monomers following: styrene, vinyltoluene, acrylonitrile, methacrylonitrile, and the abovementioned esters of acrylic acid or methacrylic acid. It is also quite common to include a small amount, such as ½ to 2.5% or more, of an acid monomer in the monomer mixture used for making the copolymers of all three general types mentioned above by emulsion polymerization. Acids used include acrylic, methacrylic, itaconic, aconitic, citraconic, crotonic, maleic, fumaric, the dimer of methacrylic acid, and so on.

These aqueous dispersions may be made using one or more emulsifiers of anionic, cationic, or non-ionic type. Mixtures of two or more emulsifiers regardless of type may be used, except that it is generally undesirable to mix a cationic with an anionic type in any appreciable amounts since they tend to neutralize each other. The amount of emulsifier may range from about 0.1 to 6% by weight or sometimes even more, based on the weight of the total monomer charge. When using a persulfate type of initiator, the addition of emulsifiers is often unnecessary and this omission or the use of only a small amount, e.g. less than about 0.5%, of emulsifier, may sometimes be desirable from the cost standpoint (elimination of expensive emulsifier), and less sensitivity of the dried coating or impregnation to moisture, and hence less liability of the coated substrate to be affected by moisture, which, for instance, would produce coatings less liable to swelling or softening, particularly when subjected to humid atomspheres. The average particle size or diameter of these dispersed polymers may be from about 0.03 to 3 microns or even larger. The particle size, whenever referred to herein, is the "weight average diameter." This number, expressed in microns, is determined using the ultra-centrifuge. A description of the method can be found in the Journal of Colloid Science 15, pp. 563–572, 1960 (J. Brodnyan). In general, the molecular weight of these emulsion polymers are high, e.g. from about 100,000 to 10,000,000 viscosity average, most commonly above 500,000.

The improved compositions of the present invention comprise an aqueous dispersion of (1) a water-insoluble addition polymer selected from the group consisting of vinyl ester polymers, acrylic ester polymers, and vinylhydrocarbon polymers and (2) a water-insoluble copolymer of copolymerizable monoethylenically unsaturated molecules containing about ½ to 15%, and preferably 1 to 5%, by weight of monomers having a polar group selected from the group consisting of alcoholic hydroxyl, amino, carboxylic acid amide, and ureido, the latter copolymer being compatible with the former and being capable of forming therewith on drying and/or curing, a glossy, coherent film (which is clear when unpigmented) which is tough and adherent to a wide variety of substrates. The compositions impart one or more of various improved properties to coatings or coated articles obtained therefrom. For example, all of these groups are capable of enhancing the adhesion of the compositions to particular substrates depending upon the particular polar group involved. Again they also favor the receptivity to and adhesion of various subsequently applied coating compositions, the nature of the subsequently applied compositions so favored being dependent on the particular polar group. Besides adhesion, other properties may also be favorably influenced. For example, the compositions in which the polar group is an amino group tend to inhibit the development of rust over long periods of time even in atmospheres of high humidity and acidity. Thus, the resistance to rusting, the adhesion to a given substrate, or other property is improved over the corresponding property obtainable from a corresponding composition in which the last-mentioned copolymer is omitted (being replaced by a corresponding amount of the first-mentioned polymer). The particle size of the copolymer constituting component (2)

should be between 0.003 to 3 microns weight average diameter, preferably being smaller in average particle size than component (1), and it should have a molecular weight in the range between about 10,000 to 10,000,000 viscosity average.

The relative amounts of the two essential polymeric components, hereinafter simply referred to as "component (1)" and "component (2)" respectively, in the mixture, hereinafter sometimes referred to as "the polyblend," may be varied in a wide range. However, this invention is primarily concerned with these compositions in which component (1) is in predominant proportion, i.e. over 50% by weight of the two components (1) and (2). Preferred proportions are at least 85% of component (1) and up to 15% of component (2). Depending on the proportion of the polar group in component (2), the working proportion of component (2) may be as low as ½ to 0.02% of the total weight of components (1) and (2), especially when component (2) has a smaller particle size than component (1).

For most purposes the components (1) and (2) are of such constitution that the aqueous composition comprising them is capable of forming a continuous film when a film of the composition is allowed to dry while exposed to the ambient temperature normally prevailing when the painting or impregnation is carried out. The apparent second order transition temperature ($T_i$) of the polymeric component (1) may be as high as 90° C. but for many purposes it is preferably between −40° C. and 25° C. The $T_i$ value referred to is the apparent second order transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

In general, if one of the polymeric components has a relatively low $T_i$ value, as compared to the 20 to 25° C. range, the other may be correspondingly higher since in this case the former serves in effect to plasticize the latter. The water in the composition tends to plasticize polymers containing large proportions of vinyl acetate so that polymers of this type may have relatively higher $T_i$ values even though the other polymeric component does not have a particularly low $T_i$ value. One or both polymer components may have $T_i$ values well above the temperatures mentioned and be satisfactory for use (1) if the product coated or impregnated thereby is of such a nature that it will normally be subjected to elevated temperatures during drying or after drying as in those cases where the coated or impregnated article is passed through a drying or baking oven or tunnel or (2) if a suitable plasticizer is included so that the plasticized polymer blend has a $T_i$ value (as determined in plasticized condition) in the range of about −40° C. to about +25° C. or +30° C. Thus, the polymer blend may have a $T_i$ value in a wide range depending on the conditions of drying and/or curing to which it may be subject. However, for most purposes in which an aqueous base paint is used in temperate climates, the polymer blend, in whatever condition of plasticization it may be, whether as a result simply of the interaction between the two polymers, the effect of the aqueous medium thereon, the effect of any plasticizer, permanent or fugitive, or any combination of these influences, should have a $T_i$ value not over about 25° C. to 30° C. and preferably not over 20° C. When the aqueous base system is to be used in torrid zone climates, the $T_i$ may be substantially increased, whereas it should be reduced if use is intended for cold climates.

The particle size of the dispersed component (1) may be the same or different than that of component (2). It is to be understood that each of the two essential types of polymeric components may consist of a single polymer or either one or both components may consist of a mixture of two or more polymers of the type, the total amount of polymers of the component (1) type constituting a predominant proportion of the total amount of polymers in the mixture of components (1) and (2).

Example of monomers that may be used to provide the necessary polar groups in component (2) include the following:

For alcoholic hydroxyl:

Hydroxyalkyl vinyl ethers or sulfides in which the hydroxyalkyl group contains 1 to 3 hydroxyl groups and 2 to 18 carbon atoms, such as β-hydroxyethyl vinyl ether, 8-hydroxyoctyl vinyl ether, β-hydroxyethyl vinyl sulfide, 5-hydroxypentyl vinyl sulfide, and 18-hydroxyoctadecyl vinyl sulfide.

A hydroxyl-containing ester of an α,β-monoethylenically unsaturated acid in which the hydroxy group may be in the acid or the alcoholic moiety of the ester or in both such moieties. The unsaturated acid from which the ester is derived may be monocarboxylic or polycarboxylic. Examples include acrylic, methacrylic, itaconic, maleic, fumaric, crotonic, α-hydroxyalkyl-acrylic, aconitic, citraconic, α-acryloxyacetic, and α-methacryloxypropionic. Representative esters are 2-hydroxyethyl acryate,
methyl α-(hydroxymethyl)acrylate,
ethyl α-(hydroxymethyl)acrylate,
butyl(α-(2-hydroxyethyl)acrylate),
2-hydroxypropyl acrylate or methacrylate,
3-hydroxypropyl acrylate or methacrylate,
methyl α-(2-hydroxyphopyl)acrylate,
ethyl α-(3-hydroxpropyl)acrylate,
4-hydroxybutyl acrylate,
5-hydroxyamyl acrylate,
6-hydroxyhexyl acrylate,
7-hydroxyheptyl acrylate,
8-hydroxyoctyl acrylate,
9-hydroxynonyl acrylate,
10-hydroxydecyl acrylate,
2-hydroxyethyl methacrylate,
6-hydroxyhexyl methacrylate,
8-hydroxyoctyl methacrylate,
10-hydroxydecyl methacrylate,
3-hydroxypropyl crotonate,
5-hydroxyamyl crotonate,
6-hydroxyhexyl crotonate,
7-hydroxpheptyl crotonate,
10-hydroxydecyl crotonate,
di(2-hydroxyethyl)maleate,
di(4-hydroxybutyl)maleate,
di(6-hydroxyhexyl)maleate,
di(9-hydroxynonyl)maleate,
di(10-hydroxydecyl) maleate,
di(2-hydroxyethyl)fumarate,
di(4-hydroxybutyl)fumarate,
di(6-hydroxyhexyl)fumarate,
di(10-hydroxydecyl)fumarate, and the like. Additionally, other substituents may be incorporated into the alkyl chain, including secondary hydroxy groups, halide radicals, nitrile radicals, and the like, such as 2,3-dihydroxypropyl acrylate,
3,5-dihydroxyamyl crotonate,
6,10-dihydroxydecyl methacrylate,
di-2,6-dihydroxyhexyl maleate, and
di-2-chloro-7-hydroxyheptyl fumarate.

In all cases, the hydroxyl of each hydroxyalkyl group is at least two carbon atoms removed from the carbon atom of the adjacent —COO— radical in the ester.

For amino:
Monovinylpyridines of the formula:

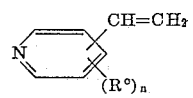

(I)

where R° is H or alkyl of 1 to 12 carbon atoms and $n$ is an integer having a value of 1 to 4. Examples include 2-vinylpyridine,
3-vinylpyridine,
4-vinylpyridine,
2-methyl-5-vinylpyridine,
5-methyl-2-vinylpyridine,
4-methyl-2-vinylpyridine,
2-ethyl-5-vinylpyridine,
2,3,4-trimethyl-5-vinylpyridine,
3,4,5,6-tetramethyl-2-vinylpyridine,
3-ethyl-5-vinylpyridine,
2,6-diethyl-4-vinylpyridine,
2-isopropyl-4-nonyl-5-vinylpyridine,
2-methyl-5-undecyl-3-vinylpyridine,
3-dodecyl-4-vinylpyridine,
2,4-dimethyl-5,6-dipentyl-3-vinylpyridine,
2-decyl-5-(α-methylvinyl)pyridine.

Also compounds of the formula $$CH_2=C(R)ZA^1NR'R^2 \qquad (II)$$

where R is H or $CH_3$, Z is O, S,

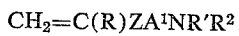, or 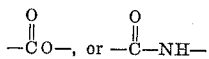

$A^1$ is an alkylene group having 2 to 8 carbon atoms, R', when not directly attached to $R^2$ is H, phenyl, methylbenzyl, benyl, cyclohexyl or alkyl having 1 to 6 carbon atoms, hydroxyalkyl having 1 to 6 carbon atoms, N-alkoxyalkyl having 2 to 6 carbon atoms, $R^2$, when not directly attached to R', is H, phenyl, methylbenzyl, benzyl, cyclohexyl or alkyl having 1 to 6 carbon atoms, and R' and $R^2$, when directly connected together, may be the morpholino residue $-C_2H_4OC_2H_4-$, the piperidino residue $$-(CH_2)_5-$$

or the pyrrolidino residue $-(CH_2)_4-$.

Examples of the latter compounds (Formula II) include 2-dimethylaminoethyl acrylate or methacrylate, β-(t-butylamino)ethyl acrylate or methacrylate, 2-dimethylaminoethyl vinyl ether or sulfide, N-(2-dimethylaminoethyl)acrylamide or methacrylamide, 2-diphenylaminoethyl acrylate or methacrylate, 2-diphenylaminoethyl vinyl ether or sulfide, N-(2-diphenylaminoethyl) acrylamide or methacrylamide, 2-morpholinoethyl acrylate or methacrylate, 2-morpholinoethyl vinyl ether or sulfide, N-(2-morpholinoethyl)acrylamide or methacrylamide, 2-piperidinoethyl acrylate or methacrylate, 2-piperiidinoethyl vinyl ether or sulfide, N-(2-piperidinoethyl) acrylamide or methacrylamide, 2-pyrrolidinoethyl acrylate or methacrylate, 2-pyrrolidinoethyl vinyl ether or sulfide, N-(2-pyrrolidinoethyl)acrylamide or methacrylamide, 3-diethylaminopropyl acrylate or methacrylate, 3-diethylaminopropyl vinyl ether or sulfide, N-(3-diethylaminopropyl)acrylamide or methacrylamide, 2-dibenzylaminopropyl acrylate or methacrylate, 2-dibenzylaminopropyl vinyl ether or sulfide, N-(2-dibenzylaminopropyl) acrylamide or methacrylamide, 8-dimethylaminooctyl acrylate or methacrylate, 8-dimethylaminooctyl vinyl ether or sulfide, N-(8-dimethylaminooctyl)acrylamide or methacrylamide.

For amides:
Compounds of the formula

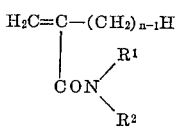 (III)

wherein $n$, $R^1$ and $R^2$ are as defined hereinabove.

Examples include acrylamide, methacrylamide, N-methylolacrylamide, N-methoxymethylmethacrylamide, N-butoxymethylacrylamide, N-β-hydroxyethylacrylamide, N-methylacrylamide, N,N-dimethylmethacrylamide, and N-benzylacrylamide.

Also cyclic groups of amido character such as compounds of the formula

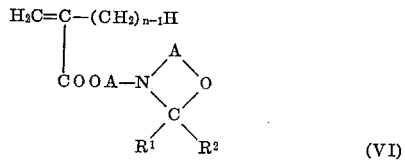 (VI)

wherein A is an alkylene group having 2 to 3 carbon atoms, such as $-CH_2CH_2-$, $-CH(CH_3)CH_2-$, and $-CH_2CH_2CH_2-$, and $n$, $R^1$ and $R^2$ are as defined hereinabove. Examples of compounds of Formula IV include:

(a) Oxazolidinylethyl methacrylate
(b) Oxazolidinylethyl acrylate
(c) Phenyloxazolidinylethyl methacrylate
(d) 3-(α-methacryloxypropyl)-tetrahydro-1,3-oxazine
(e) 3-(β - methacryloxyethyl) - 2,2 - pentamethyleneoxazolidine
(f) 3-(β - methacryloxyethyl)-2-methyl-2-propyloxazolidine For ureido:
Compounds of the formula

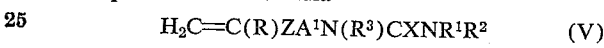

wherein
$R^3$ is selected from the group consisting of H, alkyl groups having 1 to 4 carbon atoms, hydroxyalkyl groups having 1 to 4 carbon atoms, and alkoxymethyl groups having 2 to 5 carbon atoms,
Z, $A^1$, $R^1$ and $R^2$ are as defined hereinbefore, and
X is selected from the group consisting of oxygen and sulfur.

Examples of these compounds include:

(g) β-Ureidoethyl vinyl ether,
(h) β-Ureidoethyl vinyl sulfide,
(i) β-Thioureidoethyl vinyl ether,
(j) β-Thioureidoethyl vinyl sulfide,
(k) β-Ureidoethyl acrylate,
(l) β-Thioureidoethyl methacrylate,
(m) N-(β-ureidoethyl)acrylamide,
(n) N-(β-ureidoethyl)methacrylamide,
(o) N-methyl-N'-β-methacryloxyethyl-urea,
(p) N-methylol-N'-methylol-N'-β-acryloxyethyl-urea,
(q) N-methoxymethyl-N'-β-vinyloxyethyl-urea.

Among the ureido-containing monomers, those containing a cyclic ureido group of the following Formula VI are also quite useful.

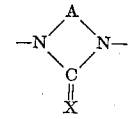 (VI)

wherein A and X are as defined hereinbefore. One of the nitrogen atoms is connected to a polymerizable monoethylenically unsaturated radical and the substituent on the other nitrogen may simply be hydrogen, or it may be methylol, alkoxymethyl having 2 to 5 carbon atoms, hydroxyalkyl having 2 to 4 carbon atoms or an aminoalkyl group having 2 to 8 carbon atoms.

The preferred cyclic ureido compounds are those which contain the group

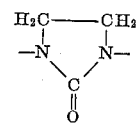 (VIII)

which may be termed the cyclic N,N'-ethyleneureido group.

Many monoethylenically unsaturated monomers contain cyclic ureido groups and are useful for producing component (2) for carrying out the invention. Compounds of the following formulas wherein Y represents the group of Formula VI above and $R^4$ is H, methylol or methoxymethyl, but is preferably H, are typical:

$$H_2C=CHYR^4 \quad (VIII)$$

$$H_2C=CHXAYR^4 \quad (IX)$$

wherein X and A are as defined hereinabove, $$H_2C=C(R)\overset{O}{\overset{\|}{C}}ZAYR^4 \quad (X)$$

where R is selected from the group consisting of H and $CH_3$, Z is selected from the group consisting of —O— and $NR^5$, $R^5$ being selected from the group consisting of H, cyclohexyl, benzyl, and an alkyl group having 1 to 6 carbon atoms, and A is as defined hereinabove;

$$H_2C=C(R)\overset{O}{\overset{\|}{C}}NR°CH_2YR^4 \quad (XI)$$

wherein R and R° are as defined hereinabove;

$$H_2C=C(R)\overset{O}{\overset{\|}{C}}OCH_2\overset{O}{\overset{\|}{C}}NR°AYR^4 \quad (XII)$$

wherein R, R° and A are defined hereinabove, and the N-[omega-(1,3-cyclodiazolidin-2-onyl)alkyl]-substituted unsaturated amic acids, their esters, and cyclic imides disclosed and claimed in U.S. Patent 2,980,652, the disclosure of that patent being incorporated herein by reference. These compounds are not readily represented in generic scope by a single formula. The acids are those in which the nitrogen atom of maleamic acid, chloromaleamic acid, fumaramic acid, itaconamic acid, or citraconamic acid is substituted by, and directly connected to a group of the formula $$-A-N\underset{\underset{X}{\overset{\|}{C}}}{\overset{A}{\diagup}\diagdown}NR^4 \quad (XIIA)$$

wherein A, X and $R^4$ are as defined hereinabove. The esters may be formed from the substituted acids by esterification with an alkanol having 1 to 4 carbon atoms and the internal cyclic imides are obtainable by dehydration of the substituted amic acids. The N-substituted amic acid and esters derived from maleamic acid are typical and have the following generic formula $$R^2O\overset{O}{\overset{\|}{C}}-CH=CH-\overset{O}{\overset{\|}{C}}-NHA-N\underset{\underset{X}{\overset{\|}{C}}}{\overset{A}{\diagup}\diagdown}NR^4 \quad (XIII)$$

in which $R^2$, A, $R^4$ and X are as defined hereinabove. The internal cyclic imides derived from maleamic acid have the formula $$\begin{matrix}HC-\overset{O}{\overset{\|}{C}}\\HC-\overset{O}{\overset{\|}{C}}\end{matrix}N-A-N\underset{\underset{X}{\overset{\|}{C}}}{\overset{A}{\diagup}\diagdown}NR^4 \quad (XIV)$$

Other such monomers have the Formula XV $$H_2C=CH-N\underset{\underset{O}{\overset{\|}{C}}}{\overset{A}{\diagup}\diagdown}NAN\begin{matrix}R^4\\R^4\end{matrix} \quad (XV)$$

wherein A and $R^4$ are as defined hereinbefore and one $R^4$ may be the same or different than the other;

The unsaturated dicarboxylic acid monoesters of a compound of the formula $$HOA^1-(OA)_{n-1}-N\underset{\underset{O}{\overset{\|}{C}}}{\overset{A}{\diagup}\diagdown}NR^4 \quad (XVI)$$

wherein $A^1$ is a $(C_2-C_8)$-alkylene group, n is an integer having a value of 1 to 4, and A and $R^4$ are as defined hereinbefore, derived from maleic, fumaric, chloromaleic, itaconic, or citraconic acid. There may also be used the benzyl, cyclohexyl, and $(C_1-C_6)$-alkyl esters of any of the monoesters just described which are disclosed in the copending application of Emmons and Falgiatore, Serial No. 112,507, filed May 25, 1961, now Patent 3,194,792, and the specific compounds disclosed therein are incorporated herein by reference. Specific examples include.

(r) β-(N,N'-ethyleneureido)ethyl acid maleate,
(s) β-(N,N'-ethyleneureido)ethyl acid fumarate,
(t) methyl β-(N,N'-ethyleneureido)ethyl fumarate,
(u) butyl β-(N,N'-ethyleneureido)ethyl fumarate.

The above compounds in which R° is hydrogen are prepared in known manner. The compounds in which R° is —$CH_2OH$ are either known or can be made from the compounds in which R° is hydrogen by reaction with formaldehyde in aqueous media at a suitable pH value, usually from 8 to 11, though in some cases lower pH values down to 1 or 2 may be used. The compounds in which R° is methoxymethyl may be obtained by reacting the compounds in which R° is hydrogen with formaldehyde in an aqueous medium containing methanol. In this case the reaction is generally started on the alkaline side, e.g. pH of 8 to 11 and completed on the acid side, e.g. from 1 to 5 or 6. The N-methoxymethyl compounds may also be prepared from the N-methylol compounds by reacting the latter in an aqueous medium containing a large concentration of the methanol at an acid pH of 1 to 6. In general, the temperature of the reaction with formaldehyde and/or methanol may be from room temperature up to reflux. Instead of methanol, ethanol or other lower alkanol may be used. The polymer of component (2) may be a mixture in which $R^4$ may be H in one portion of the component, —$CH_2OH$ in another, and alkoxymethyl, especially methoxymethyl in still another part thereof.

Specific examples of the compounds represented by the several Formulas VIII to XIII given above include:

A. Formula VIII—
  (1) N-vinyl-N,N'-ethyleneurea
  (2) N-vinyl-N,N'-ethylenethiourea
  (3) N-vinyl-N'-methylol-N,N'-ethyleneurea
  (4) N-vinyl-N'-methoxymethyl-N,N'-ethyleneurea
  (5) N-vinyl-N,N'-trimethyleneurea
  (6) N-vinyl-N,N'-propyleneurea B. Formula IX—
  (1) N-vinyloxyethyl-N,N'-ethyleneurea
  (2) N-vinylthiopropyl-N,N'-propyleneurea
  (3) N-vinyloxyethyl-N,N'-ethylenethiourea
  (4) N-vinyloxyethyl-N-methylol-N,N'-ethyleneurea
  (5) N - vinyloxyethyl - N-ethoxymethyl-N,N'-ethyleneurea
  (6) N-vinylthioethyl-N-methylol-N,N'-ethyleneurea C. Formula X—
  (1) N-(β-acrylamidoethyl)-N,N'-ethyleneurea
  (2) N-(β-methacrylamidoethyl)-N,N'-ethyleneurea
  (3) N - (β-acrylamidopropyl)-N,N'-propylenethiourea
  (4) N - (β - methacrylamidoethyl)-N-methylol-N,N'-ethyleneurea
  (5) N - (β-acrylamidoethyl)-N-butoxymethyl-N,N'-ethyleneurea
  (6) N-(β-acryloxyethyl)-N,N'-ethyleneurea
  (7) N - (β - methacryloxypropyl)-N-methylol-N,N'-propyleneurea (8) N-(β-acryloxyethyl)-N-methoxymethyl-N,N'-ethyleneurea
(9) N-(β-acryloxyethyl)-N-methylol-N,N'-ethylenethiourea
(10) N-(3-acryloxypropyl)-N,N'-trimethyleneurea D. Formula XI—
(1) N-acrylamidomethyl-N,N'-ethyleneurea
(2) N-methacrylamidomethyl-N,N'-ethyleneurea
(3) N-acrylamidomethyl-N-methylol-N,N'-ethyleneurea
(4) N-acrylamidomethyl-N,N'-ethylenethiourea
(5) N-acrylamidomethyl-N-methylol-N,N'-propyleneurea
(6) N-methacrylamidomethyl-N,N'-trimethyleneurea E. Formula XII—
(1) N-[β-(α-acryloxyacetamido)ethyl]-N,N'-ethyleneurea
(2) N-[β-(β-acryloxyacetamido)ethyl]-N-methylol-N,N'-ethyleneurea
(3) N-[β-(α-methacryloxyacetamido)ethyl]-N,N'-ethyleneurea
(4) N-(β-(α-methacryloxyacetamido)ethyl]-N-methylol-N,N'-ethylenethiourea
(5) N-[β-(α-methacryloxyacetamido)propyl]-N,N'-propyleneurea
(6) N-[β-(α-acryloxyacetamido)propyl]-N,N'-trimethyleneurea
(7) N-[β-(α-methacryloxyacetamido)ethyl]-N-methylol-N,N'-ethyleneurea F. Formulas XIII, XIV, and related compounds from other unsaturated dicarboxylic acids—
(1) N-[β-(β-carboxyacrylamido)ethyl]-N,N'-ethyleneurea
(2) N-[β-(β-carboxymethoxyacrylamido)ethyl]-N,N'-ethyleneurea
(3) N-[β-(α-carboxymethylacrylamido)ethyl]-N-methylol-N,N'-ethyleneurea
(4) N-[β-(β-carboxy-β,α-butenoamido)ethyl]-N,N'-ethyleneurea
(5) N-[β-(β-trans-carboxymethoxyacrylamido)-ethyl]-N,N'-ethyleneurea
(6) N-[β-(2-keto-1-imidazolinyl)ethyl]maleimide
(7) N-[3-(2-keto-1-hexahydropyrimidinyl)propyl]-maleimide
(8) N-[β-(2-keto-1-imidazolidinyl)ethyl]itaconimide
(9) N-(β-(β-carboxyamido)propyl]-N-methylol-N,N'-propyleneurea
(10) N-[β-(β-carboxyamido)ethyl]-N,N'-ethylenethiourea
(11) N-[β-(β-carboxyamido)ethyl]-N-methoxymethyl-N,N'-ethyleneurea In general, the compositions in which the component (2) comprises a copolymer of a monomer containing a cyclic amido group (e.g. of Formula IV) or a cyclic ureido group (e.g. any of Formulas VI to XVI inclusive) are preferred because they generally impart more versatile properties to the compositions including especially adhesion of improved quality to a wider variety of substrates than is ordinarily obtainable from the other polar monomers mentioned hereinabove.

The polymers and copolymers used in the composition of the present invention may be made by direct emulsion polymerization of the monomers including the monomer containing the polar group. Alternatively, the copolymers may be produced by polymerizing monomers including one or more of such constitution that it or they can be converted after polymerization by suitable reaction into units having the groups desired, such as the polar group required in polymeric component (2). For example, itaconic anhydride may be copolymerized in the proper relative proportion with another monomer, such as any of those used in making polymeric component (1) and then reacted with an amine of the formula

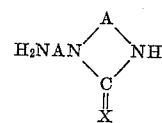
(XXII)

in which A and X are as defined hereinabove to thereby introduce a cyclic ureidoalkyl substituent into the polymerized anhydride unit which is converted into the N-cyclic ureidoalkyl-substituted amic acid.

Polymeric component (2) may be separately formed, as by aqueous emulsion polymerization, and then the dispersion thereof may be mixed into the aqueous dispersion of polymeric component (1) in appropriate proportions. Alternatively, component (2) may be prepared by emulsion copolymerization in an aqueous dispersion of polymeric component (1) so that partial grafting of the monomers on polymeric component (1) occurs.

The monomer containing the polar group, or convertible to introduce a polar group, may be copolymerized with one or more other monoethylenically unsaturated monomeric compounds copolymerized therewith. Examples of these compounds are vinyl esters of fatty acids having from 1 to 18 carbon atoms, acrylic acid esters or methacrylic acid esters of a saturated alcohol having 1 to 18 carbon atoms, acrylonitrile, methacrylonitrile, glycidyl acrylate, glycidyl methacrylate, styrene, vinyltoluene, vinyl chloride, vinylidene chloride, vinyl $(C_1–C_8)$-alkyl ethers, N-mono- or N, N-di-$(C_1–C_{18})$-alkyl-substituted acrylamides or -methacrylamides, ethylene, propylene, isobutylene, chlorotrifluoroethylene, tetrafluoroethylene and any other such monomer which does not render the copolymer water-soluble under the conditions of pH the aqueous compositions comprising the copolymer are to be used. Small amounts up to 5% or 10% by weight, based on the weight of the polymer, of one or more hydrophilic monomers (which in the component (2) are monomers other than those containing the required polar groups) may be used provided they are not used in such large amounts as to render the copolymers soluble in water under the conditions of formulation and use of the compositions. Examples of these monomers include copolymerizable α,β-monoethylenically unsaturated acids, such as acrylic acid, methacrylic acid, itaconic acid, maleic acid, aconitic acid, acryloxyacetic acid, and so on; amides, such as acrylamide, methacrylamide, N-methyl acrylamide, N-methylol methacrylamide, alcohols such as β-hydroxyethyl or β-hydroxypropyl acrylate or methacrylate, N-hydroxyethyl-acrylamide, and amines, such as β-aminoethyl vinyl ether, dimethylaminoethyl acrylate or methacrylate, dimethylaminoethyl vinyl ether or sulfide, and N-(dimethylaminoethyl) acrylamide.

The aqueous compositions may be composed entirely of the mixture of polymer components (1) and (2) when it is desired to use the blend in situations where a clear impregnant, binder, or coating is needed. Thus, in the stabilization or crease-proofing of fibrous materials, e.g. woven fabrics of cellulose or wool and the bonding of non-woven webs, or fabrics or in providing a clear, protective coating over printed matter on paper, leather, or other substances, the aqueous dispersions of the two polymeric components (1) and (2) may be used without other auxiliary materials.

However, the compositions may contain added materials of various kinds to vary the properties and to adapt the compositions for various uses. For example, plasticizers may be added.

In making pigment-printing and dyeing compositions for application to textile fabrics and in making water-base paints, incorporation of pigments and/or dyes is important. The relative proportions of binder to pigment may fall in a wide range, such as from a ratio of 1:20 to 20:1 but for the most purposes is from 0.5:1 to 5:1.

Pigment compositions used in interior and exterior house paints usually comprise hiding white pigments, other tints and colors ordinarily being obtained by mixing other colored paint pigments with the white pigments. Any of the inorganic and organic pigments, pigment lakes, insoluble dyes and other durable coloring matter ordinarily used in formulating durable exterior paints, varnishes, enamels and lacquers can be used in pigmenting the invention paint compositions. Typical useful white hiding pigments are: rutile titanium dioxide, anatase titanium dioxide, zinc oxide, leaded zinc oxide, zinc sulfide, lead titanate, antimony oxide, zirconium oxide, white lead, basic lead silicate, lithopone, titanated lithopone, titanium-barium pigment, titanium-calcium pigment and titanium-magnesium pigment. The titanium dioxide pigments ordinarily are preferred.

While the indicated pigmentation can be solely of hiding prime pigments, it is economically impractical to use solely prime pigments at the indicated high pigment volume concentration. As is ordinary practice in paint formulation, the total pigment usually consists of hiding prime pigments extended with well-known pigment extenders such as calcium carbonate, gilders whiting talc, barytes, magnesium silicates, aluminum silicates, diatomaceous earth, china clay, asbestine, silica and mica. The relative proportions of the prime white pigment and the pigment extender in the pigment mixture may be varied widely, but usually the hiding prime pigment is present at a pigment volume concentration which provides the desired paint covering power or hiding and the extender pigment is present in an amount which provides the paint with the desired total pigment volume concentration. Prime pigments and extender pigments range widely in density, but ordinarily white house paints and light tints thereof have a pigment composition whereof the extender pigment is present in the weight proportion of .4 to 4 parts per part of hiding prime pigment.

Pigments can be dispersed in the aqueous paint vehicle by any of the well-known techniques of pigment dispersion in paint formulation, such as roller milling, ball or pebble grinding, sand grinding as described in Hochberg U.S. Patent 2,581,414, paddle-mixer dispersion techniques, Werner-Pfleiderer "dough" mixer mixing and other pigment paste techniques. The pigments can be dispersed in either of the aqueous dispersion polymer compositions prior to combining the respective compositions as the aqueous dispersion polymer polyblend, they can be dispersed in the preformed polyblend vehicle, or the pigments can be wet and dispersed in a separate aqueous slurry in the absence of the pertinent polymer components of the polyblend and then combined with the aqueous dispersion polymer polyblend by simple mixing. The order of combining the pigments is not significantly critical. The pigment composition is preferably dispersed in the presence of a water-soluble and swellable colloidal bodying agent and an auxiliary surfactant in addition to the surfactants present in the respective latices to stabilize the polymer dispersions. The auxiliary surfactant for dispersing the pigment composition can be non-ionic, anionic, or cationic, preferably of the water-soluble type. The selection of this dispersing surfactant is judicious to provide compatibility and non-reactivity with the dispersion stabilizing surfactants of the respective aqueous dispersions of the polyblend paint vehicle. The surfactant for dispersing the pigment composition may be the same or different from the stabilizing surfactants of the polyblend. Ordinarily a concentration of up to 2% of the auxiliary pigment-dispersing surfactant based on the weight of the pigment composition is adequate, the preferred concentration being 0.1% to 1% on the indicated basis. It is preferred that the total amount of pigment dispersing surfactant and the stabilizing surfactants of the respective latices does not exceed 10% based on the total weight of components (1) and (2).

The rheological characteristics of the paint can be varied to suit the application needs. The presence of combined carboxylic acid units in the copolymers are helpful in altering the rheological characteristics, particularly when carboxylic substituents are reacted with ammonium hydroxide to form the ammonium carboxylate of the ester copolymer. The aqueous dispersion paint ordinarily is adjusted to an alkaline state of 7.5 to 10 pH with ammonium hydroxide. When the polymers do not contain combined carboxylic or carboxylate units, there may be added to the compositions such substances as polyacrylic acid, polymethacrylic acid, water-soluble or water swellable copolymers of acrylic acid or methacrylic acid, or water-soluble and water-swellable carboxylates of copolymers of these acids to modify the rheological characteristics. Water-soluble cellulose derivatives such as methyl cellulose, carboxymethyl cellulose or hydroxyethyl cellulose, especially methyl cellulose, can also be used for bodying purpose. These materials are used in their ordinary small effective proportions.

Another desirable ancillary component which is preferentially present in the aqueous dispersion paint composition is a volatile water-soluble organic anti-freeze agent to provide the aqueous paint with freeze-thaw stability. Ethylene glycol is especially useful for this purpose at concentrations up to about 5% by weight of the total composition. Other glycols and polyglycols can be used for this purpose.

Aqueous dispersion paint composition containing surfactants ordinarily foam unless selection of the dispensants is specifically directed to the inherently non-foaming species. Anti-foam agents are ordinarily included in the aqueous paint formulation to minimize foaming. High boiling alcohols, polyglycols, silicon liquids and other anti-foam agents well-known to the coating art can be included in the composition as an ancillary component.

As with conventional paints and enamels formulated from drying oils and from alkyd resins, the pains coalesced from the invention composition may exhibit fungus attack and, therefore, it is further desirable to include a preservative or fungicidal agent in the paint. Any of the well-known preservative agents used in paint formulations can be used in their usual small effective proportions. Phenyl mercury oleate and other phenyl mercurial fungicides are especialy useful at active concentrations from 0.05 to 0.3% by weight of the composition.

The paint compositions of this invention ordinarily are adequately flexible that the external plasticization of the polymer polyblend is unnecessary. However, ancillary plasticizer can be included in the composition in a minor proportion up to 10% by weight of the polyblend, preferably no more than 5%. Non-volatile ester plasticizers, for example, the phosphates, such as tricresyl phosphate, and the phthalates, such as dibutyl phthalate, or the polymeric polyester or alkyd plasticizers can be used.

While the total non-volatile content of the aqueous dispersion paint composition, ordinarily designated as the solids content, can vary widely, it is desirable that the non-volatile content be at least 30% by weight in order that a practical amount of paint per coat is applied. The aqueous paint can be satisfactorily formulated in a non-volatile content as great as 70%, but at this concentration thinning with water is ordinarily necessary for satisfactory application. The preferred non-volatile content is from about 40% to 60% by weight.

The viscosity of the aqueous dispersion paint composition also can be varied widely. A stormer viscosity of about 70 to 100 K.U. at 25° C. is a desirable ready-to-apply brush consistency. This is not a critical characteristic as the paint can be further modified satisfactorily with thixotropy controlling agents to provide the composition with non-drip characteristics with adequate brushout characteristics.

Other auxiliary materials that may be used include: dispersing agents for dispersing and maintaining in a finely divided state the pigments, colors, or extenders, such as aromatic sulfonates condensed with formaldehyde or any of the suitable commercial dispersing agents which are for this purpose, sequestering agents for controlling polyvalent metal ions sometimes introduced by pigments, colors, or extenders, such as complex alkali metal phosphates or ethylene polyaminoacetates, defoaming agents, including waxes, oils, or mineral spirits, or an alkylphenoxyethanol, fatty acid amides, phosphate esters, or a solution of an amine or amide in an oil; humectants, such as water-soluble gums, ammonium or sodium polyacrylate, glycol laurate, propylene glycol, diethylene glycol, etc.; thickeners, such as water-soluble gums, water-soluble polyacrylates and methacrylates, water-dispersed starches and proteins, etc.; bactericides and/or fungicides, such as borax, pentachlorophenols, or mercury compounds; perfume-like materials, including neutralizing and masking agents, which are used to overcome odors or to impart pleasant and distinctive odors; other resinous materials in dispersed form, such as alkyd resins, drying oils, or latices of styrene or of styrene and butadiene to cheapen and extend the binders of this invention, and auxiliary corrosion-inhibiting agents, such as sodium benzoate, sodium dichromate, guanyl urea phosphate, or sodium nitrite, in an amount of 0.05% to 5%, and most commonly 0.1% to 2% of the dispersed copolymer, etc.

The compositions of the present invention may be of strictly thermoplastic character or they may be of thermosetting character, as when $R^4$ is methylol or alkoxymethyl. The compositions may also comprise auxiliary components which impart, or enhance, the thermosetting qualities thereof. For example, there may be added an aldehyde, such as formaldehyde, an aminoplast or phenoplast, such as the resin-foaming condensates of formaldehyde with phenol, urea, N,N'-ethyleneurea, 5-alkyl- or 5-hydroxyethyltriazones, aminotriazines, such as melamine, as well as the methylated derivatives of these condensates, polyvic-epoxides) of aliphatic or aromatic types, alkyd resins, i.e. polyesters of polycarboxylic acids (e.g. phthalic, adipic, or sebacic) with a polyol (e.g. ethylene glycol, glycerol, trimethylolethane), and oil-modified types of alkyds containing from 25 to 60% of long chain fatty acid or ester (e.g. soybean oil). The content of these auxiliary materials may be from 1% to 35% by weight of the total weight of polymeric components (1) and (2).

When the thermosetting forms of the compositions of the present invention are used, the coating or impregnation may simply be dried at room temperature or whatever exterior temperature may prevail at the time as would be done with the simple thermoplastic types, reliance for development of cure being placed upon ageing for an extended period of time, e.g. several days, weeks, or in some cases, months. On the other hand, the cure of such films may be hastened by drying at elevated temperatures or heating at elevated temperatures (up to 200° C.) for several minutes to a half-hour after drying at room temperatures.

While, as stated hereinbefore, the average particle sizes of the two polymer components may be the same, it has been found, surprisingly, that by using for component (2) of the composition a polymer whose average particle size is appreciably smaller (by at least 30%) than the average particle size of the polymer of component (1), the adhesion obtained to particular surfaces, especially wood, and bare or primed metals, such as iron or steel, is markedly increased for a given percentage content of polymerized units of a monomer containing one of the defined polar groups, the content thereof being based on the total weight of component (1) and (2) polymers.

Compositions of the present invention in which component (2) polymer has a small average particle size in the range of 0.03 to 0.2 micron are especially valuable for application to porous materials, e.g. textiles, paper, wood, masonry, asbestos-cement shingles or siding, surfaces carrying chalky weathered oil-base paint or alkyd paint, rusty and corroded metal surfaces, e.g. rusty iron, or corroded copper, zinc and aluminum. These compositions have outstanding penetrability and adhesion characteristics.

For making water-based paints to be applied by brushing as well as by spraying or roller coating, exceptionally good compositions are those in which the average particle size of the component (1) polymer is in the range of 0.3 to 3 microns and the average particle size of the component (2) polymer is at least 50% smaller and is in the range of 0.05 to 0.5 micron. The water-base paints obtained from such compositions have excellent wet and dry adhesion to the surfaces on which they are applied, and they have outstanding flow and leveling characteristics, i.e. they have practically no tendency to show brush marks.

The compositions of the present invention should contain sufficient of polymer component (2) to provide in the composition, at least 0.005% by weight, based on the total weight of components (1) and (2), of units or mers containing the defined polar groups. While as much as about 7% of such units may be present, it is generally true that the maximum effect or optimum properties are obtained when the composition contains about 0.02 to 0.5% by weight of the defined polar group-containing mers or units, based on the total weight of components (1) and (2).

In making water-base paints, the preferred formulations generally fall within the scope of the following tabulation, wherein the percentages indicate the solids content.

| Material: | Percent by wt. |
|---|---|
| Aqueous dispersed polyblend | 10 to 30 |
| Pigment composition | 15 to 55 |
| Stabilizing and dispersing surfactants | 0.1 to 2.5 |
| Bodying or rheology control agent, e.g. sodium polyacrylate | 0 to 4.0 |
| Anti-freeze agent, e.g. ethylene glycol | 0 to 5 |
| Anti-foam agent, e.g. polypropylene glycol | 0 to 2 |
| Fungicidal preservative, e.g. phenyl mercurial salt | 0 to 1.0 |
| Ammonium hydroxide, to pH value 7.5 to 10. | |
| Water, balance to make 100. | |

The pigment volume concentration is preferably from 25% to 65%. The total of the dispersing and stabilizing surfactants is an amount no greater than 10% based on the weight of water-insoluble material in the polyblend. The rheology controlling water-soluble organic polymer having combined units of an alpha,beta-monovinylidene monocarboxylic acid can be present in the acidic form or as the water-soluble carboxylate salt, such as the ammonium salt.

In the following examples, which are illustrative of the invention, the parts and percentages are by weight unless otherwise specifically indicated. Also, the specific monomeric compounds containing the defined polar groups are referred to either by name, or by a letter in parentheses corresponding to the designation hereinbefore (e.g. "monomer (a)" for oxazolidinyl methacrylate) or in the case of the cyclic ureido compounds used therein by reference to the several categories hereinabove; for example, "monomer A2" refers to a compound of Formula III and is specifically N-vinyl-N,N'-ethyleneurea.

EXAMPLE 1

(a) An aqueous dispersion of a poly(vinyl acetate) containing about 48% of the polymer in which the average particle size of the polymer is about 3 microns is mixed with an aqueous dispersion containing 46% of a copolymer, having an average particle size of 0.15 micron, of 75% ethyl acrylate, 20% methyl methacrylate, 2% methacrylic acid, and 3% of monomer C2. The first dispersion contains 3.0%, based on polymer weight, of a low molecular weight hydroxyethyl cellulose as the emulsifier, and the second contained 1%, on the weight of polymer of sodium octyl sulfosuccinate as the emulsifier.

They were mixed in the ratio of 100:25 weight ratio of the first dispersion to the second.

(b) The resulting composition is film-forming at normal prevailing temperature. It forms an excellent clear coating for paper, especially for the protection of the printed covers of paper-backed books. For this purpose, a somewhat harder but still flexible coating is obtained from the compositions when it is modified by the incorporation of formaldehyde or about 10% (on total weight of polymer, of a fully methylated polymethylol melamine and the drying is effected at a temperature of about 110° C. for about 10 minutes.

EXAMPLE 2

A paint especially adapted for use as a primer or sealer, e.g. on rockwall board and wood trim is prepared using the following formulation.

| First portion: | Percent by wt. |
|---|---|
| Dispersing agent, sodium salt of 1:1 mol ratio disobutylene/maleic anhydride copolymer (25% aqueous solution) | 0.8 |
| Wetting agent, benzyl ether of tert-octylphenoxypoly(20)ethoxyethanol | 0.2 |
| Anti-foaming agent, Balab 748 | 0.2 |
| Water | 4.8 |
| Second portion: | |
| Hiding prime pigment, titanium dioxide | 7.3 |
| Extender pigment, calcium carbonate | 18.9 |
| Third portion: | |
| Polyblend component 1, vinyl acetate-dibutyl maleate copolymer 80/20 (52% polymer content latex, average particle size, 0.5 micron) | 32.5 |
| Polyblend component 2, copolymer of 60% ethyl acrylate, 35.5% methyl methacrylate, 1.5% methacrylic acid, and 3% monomer D3 (45% polymer content latex, average size, 0.15 micron | 4.2 |
| Water soluble thickener, polyacrylic acid (28% polymer in water) | 2.7 |
| Water | 28.4 |
| Phenyl mercury succinate (10% in mineral spirits) | 0.2 |
| | 100.0 |

*Mixing instructions*

Premix ingredients in first portion in a change can mixer. Sift in slowly second portion ingredients in the order listed. Continue mixing pigment paste for 30 minutes. Add third portion ingredients in the order listed—adjust final pH to approximately 8.6 with ammonium hydroxide.

EXAMPLE 3

A paint especially adapted for coating metals is prepared using the following formulation.

| First portion: | Percent by wt. |
|---|---|
| Dispersing agent, sodium salt of 1:1 mol ratio diisobutylene/maleic anhydride copolymer (25% aqueous solution) | .8 |
| Wetting agent, benzyl ether of tert-octylphenoxypoly(20)ethoxyethanol | .2 |
| Anti-foam agent, Balab 748 | .2 |
| Ethylene glycol | 2.0 |
| Hydroxyethyl cellulose WF-4400 (2% aqueous solution) | 6.6 |
| Water | 2.4 |
| Second portion: | |
| Rutile titanium dioxide (R-610) | 16.9 |
| Anatase titanium dioxide (FF) | 1.9 |
| Zinc oxide (Kadox 15) | 0.5 |
| Water ground mica (#325 mesh) | 2.2 |
| Calcium carbonate (Suspenso whitening) | 14.6 |

| Third portion: | Percent by wt. |
|---|---|
| Polyblend component 1, copolymer of 60% ethyl acrylate, 39% methyl methacrylate, and 1% acrylic acid (46% polymer content latex, 0.4 micron) | 48.55 |
| Polyblend component 2, copolymer of 68% ethyl acrylate, 28% methyl methacrylate, 1% acrylic acid and 3% monomer B1 (46% polymer content latex, 0.1 micron) | 2.5 |
| Phenyl mercury succinate (10%) | 0.3 |
| Balab 748 | 0.2 |
| Ammonium hydroxide (28% $NH_3$ in water) | 0.1 |
| | 100.0 |

*Mixing instructions*

Premix ingredients in first portion in a change can mixer. Sift in slowly second portion ingredients in order listed. When last pigment is incorporated, pass paste through a stone mill. Add third portion ingredients in order listed. Note: Premix preservative, anti-foamer and $NH_4OH$ before addition.

EXAMPLE 4

A paint especially useful for backing oleoresinous impregnated felt-base floor coverings is formulated as follows.

| First portion: | Percent by wt. |
|---|---|
| Sodium salt of 1:1 mol ratio diisobutylene/maleic anhydride copolymer (25% aqueous solution) | 3.0 |
| Water | 21.76 |
| Second portion: | |
| Whiting No. 10 ($CaCO_3$) | 39.0 |
| Clay | 13.0 |
| Third portion: | |
| Polyblend component 1, 35% styrene/65% butadiene copolymer (65% polymer latex, 0.4 micron) | 17.0 |
| Polyblend component 2, copolymer of 60% butyl acrylate, 34% methyl methacrylate, 1% acrylic acid, and 5% monomer C1 (46% polymer latex, 0.1 micron) | 4.24 |
| Water soluble thickener, sodium polyacrylate (10% solids in water) | 2.0 |
| | 100.0 |

*Mixing instructions*

Premix ingredients in first portion. Sift in slowly second portion ingredients. Continue mixing until a smooth uniform paste is obtained. Add polyblend components in order listed. Add water soluble thickener with slow agitation.

EXAMPLE 5

An excellent wood adhesive is obtained by mixing 100 parts of a 50% solids polyvinyl acetate latex in which the average particle size is 1.4 microns with 6 parts of a 47% solids dispersion of an emulsion copolymer of 70% ethyl acrylate, 26% methyl methacrylate, 1% acrylic acid and 3% of monomer E1, the average size of the particles being 0.1 micron.

EXAMPLE 6

Several primers are prepared as in Example 2 except that:

(a) In one instance component 1 is replaced with a polyvinyl acetate latex having 52% polymer content and an average particle size of 2.7 microns.

(b) In another instance, component 2 is replaced with an aqueous dispersion containing 45% of a copolymer of 65% butyl acrylate, 10% acrylonitrile, 15% styrene, 2% itaconic acid, and 8% β-hydroxyethyl methacrylate having an average particle size of 0.2 micron.

(c) In a third case, component 2 is replaced by an aqueous dispersion containing 45% of a copolymer of 60% methyl acrylate, 32% butyl methacrylate, and 8% of 4-vinylpyridine having an average particle size of 0.19 micron.

(d) In a fourth case, component 2 is replaced by a 45% solids latex of a copolymer of 70% ethyl acrylate, 22% vinyl acetate, and 8% of dimethylaminoethyl methacrylate, having an average particle size of 0.13 micron.

(e) In another instance, component 2 is replaced by a 45% solids latex of a copolymer of 40% vinylidene chloride, 54% ethyl acrylate, 1% methacrylic acid and 5% methacrylamide having an average particle size of 0.17 micron.

(f) In a sixth case, component 2 is replaced by a 45% latex of a copolymer of 45% ethyl acrylate, 15% 2-ethylhexyl acrylate, 30% vinyltoluene, 2% methacrylic acid, and 8% oxazolidinyl ethyl methacrylate having an average particle size of 0.2 micron.

(g) In another case, component 2 is replaced by a 45% latex of a copolymer of 50% butyl acrylate, 39% methyl methacrylate, 1% acrylic acid, and 10% β-ureidoethyl vinyl sulfide having an average particle size of 0.16 micron.

(h) In another case, component 2 is replaced by a 45% latex of a copolymer of 50% butyl acrylate, 10% methyl acrylate, 32% methyl methacrylate, ½% acrylic acid, and 7.5% monomer A4, having an average particle size of 0.2 micron.

(i) In another case, component 2 is replaced by a 45% latex of a copolymer of 45% ethyl acrylate, 15% 2-ethylhexyl acrylate, 30% vinyltoluene, 2% methacrylic acid, and 8% monomer F2, having an average particle size of 0.2 micron.

(j) In another instance, component 2 is replaced by a 45% solids latex of a copolymer of 40% vinylidene chloride, 54% ethyl acrylate, 1% methacrylic acid and 5% monomer(s) having an average particle size of 0.17 micron.

EXAMPLE 7

Several paints especially useful not only for coating masonry, brick and wood but also for coating metals are prepared as in Example 3 except that:

(a) In one instance, component 2 is replaced with an aqueous dispersion containing 45% of a copolymer of 65% butyl acrylate, 10% acrylonitrile, 15% styrene, 2% itaconic acid, and 8% β-hydroxyethyl vinyl sulfide having an average particle size of 0.2 micron.

(b) In another case, component 2 is replaced by an aqueous dispersion containing 45% of a copolymer of 60% methyl acrylate, 32% butyl methacrylate, and 8% of monomer E3 having an average particle size of 0.19 micron.

(c) In another case, component 2 is replaced by a 45% solids latex of a copolymer of 70% ethyl acrylate, 22% vinyl acetate, and 8% of monomer C6, having an average particle size of 0.13 micron.

I claim:

1. A composition adapted to form flexible, tough adherent coating and impregnant films comprising an aqueous dispersion of (1) a water-insoluble addition polymer selected from the group consisting of vinyl ester polymers, acrylic ester polymers, and vinylhydrocarbon polymers and (2) a water-insoluble copolymer of copolymerizable monoethylenically unsaturated molecules comprising 1 to 15% by weight of at least one monomer containing a polar group selected from the group consisting of alcoholic hydroxyl, amino, amido, and ureido groups, the polymeric components (1) and (2) being compatible to form an adherent film on a substrate, component (1) being present in predominant proportion relative to components (1) and (2), and the relative amounts of components (1) and (2) being predetermined to provide from 0.005 to 7%, based on the total weight of (1) and (2), of polymerized monomer units containing the aforesaid polar group, the polymer of component (1) having an average particle size of at least 0.03 micron, the polymer of component (2) having an average particle size from 0.003 to 3 microns and the average particle size of component (2) being at least 30% smaller than the average particle size of component (1), the polymers of components (1) and (2) having molecular weights in the range of about 10,000 to 10,000,000, and the $T_i$ value of the polymers being not over 25° C.

2. A composition as defined in claim 1 in which the average particle size of the polymer of component (2) is in the range of 0.03 to 0.2 micron.

3. A water-base paint comprising a composition as defined in claim 2 and comprising a pigment, the ratio of the weight of pigment to the total weight of the polymers of components (1) and (2) being from 20:1 to 1:20.

4. A composition as defined in claim 1 in which the average particle size of the polymer of component (1) is in the range of 0.3 to 3 microns and the average particle size of the polymer of component (2) is in the range of 0.05 to 0.5 micron and is at least 50% smaller than the average particle size of component (1).

5. A water-base paint comprising a composition as defined in claim 4 and comprising a pigment, the ratio of the weight of pigment of the total weight of the polymers of components (1) and (2) being from 20:1 to 1:20.

6. A water-base paint comprising a composition as defined in claim 1 and comprising a pigment, the ratio of the weight of pigment to the total weight of the polymers of components (1) and (2) being from 20:1 to 1:20.

7. A composition adapted to form flexible, tough adherent coating and impregnant films comprising an aqueous dispersion of (1) a water-insoluble addition polymer selected from the group consisting of vinyl ester polymers, acrylic ester polymers, and vinylhydrocarbon polymers and (2) a water-insoluble copolymer fo copolymerizable monoethylenically unsaturated molecules of which 1 to 15% by weight contain a cyclic ureido group of the formula

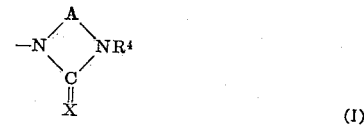

(I)

in which

A is an alkylene group having 2 to 3 carbon atoms,
$R^4$ is selected from the group consisting of H, —CH$_2$OH, and —CH$_2$OCH$_3$, and
X is selected from the group consisting of O and S, the polymeric components (1) and (2) being compatible to form an adherent film on a substate, component (1) being present in predominant proportion relative to components (1) and (2), and the relative amounts of components (1) and (2) being predetermined to provide from 0.005 to 7%, based on the total weight of (1) and (2), of mers containing the aforesaid cyclic ureido group.

8. A composition adapted to form flexible, tough adherent coating and impregnant films comprising an aqueous dispersion of (1) a water-insoluble addition polymer selected from the group consisting of vinyl ester polymers, acrylic ester polymers, and vinylhydrocarbon polymers and (2) a water-insoluble copolymer of copolymerizable monoethylenically unsaturated molecules comprising 1 to 15% by weight of at least one cyclic amido group-containing compound of the formula

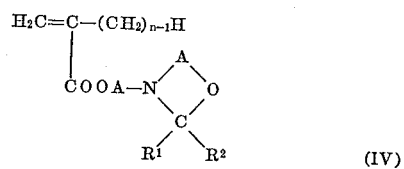

(IV)

wherein

A is an alkylene group having 2 to 3 carbon atoms,
$n$ is an integer having a value of 1 to 2, and
$R^1$ and $R^2$ are selected from the group consisting of (1) separate groups selected individually from (a) hydrogen, phenyl, benzyl, and ($C_1$–$C_{12}$) alkyl groups in the case of $R^1$ and (b) hydrogen and ($C_1$–$C_4$) alkyl groups in the case of $R^2$ and (2) a single group selected from the group consisting of pentamethylene and tetramethylene which together with the carbon atom to which the single group is attached forms a carbocyclic group, the polymeric components (1) and (2) being compatible to form an adherent film on a substrate, component (1) being present in predominant proportion relative to components (1) and (2), and the relative amounts of components (1) and (2) being predetermined to provide from 0.005 to 7%, based on the total weight of (1) and (2), of mers containing the aforesaid cyclic amido group.

9. A composition as defined in claim 8 in which the polymer of component (1) has average particles sizes in the range from 0.03 to 3 microns and the polymer of component (2) has average particle sizes from 0.003 to 3 microns.

10. A composition as defined in claim 8 in which the polymers of components (1) and (2) have average particle sizes in the range from 0.03 to 3 microns and their molecular weights are in the range of about 10,000 to 10,000,000.

11. A composition as defined in claim 8 in which the polymers of components (1) and (2) have average particle sizes in the range of from 0.03 to 3 microns, their molecular weights are in the range of 100,000 to 10,000,000 and the $T_1$ value of the polymers is not over 25° C.

12. A composition as defined in claim 8 in which the polymer of component (1) has an average particles size in the range from 0.03 to 3 microns, and the polymer of component (2) has an average particle size of at least 0.003 micron and the average particle size of component (2) is at least 30% smaller than the average particle size of component (1).

13. A composition as defined in claim 8 in which the average particle size of the polymer of component (2) is in the range of 0.03 to 0.2 micron.

14. A composition as defined in claim 8 in which the average particle size of the polymer of component (1) is in the range of 0.3 to 3 microns and the average particle size of the polymer of component (2) is in the range of 0.05 to 0.5 micron and is at least 50% smaller than the average particle size of component (1).

15. A water-base paint comprising a composition as defined in claim 8 and comprising a pigment, the ratio of the weight of pigment to the total weight of the polymers of components (1) and (2) being from 20:1 to 1:20.

16. A composition as defined in claim 7 in which the polymer of component (1) has average particle sizes in the range from 0.03 to 3 microns and the polymer of component (2) has average particle sizes from 0.003 to 3 microns.

17. A composition as defined in claim 7 in which the polymers of components (1) and (2) have average particle sizes in the range from 0.03 to 3 microns and their molecular weights are in the range of about 10,000 to 10,000,000.

18. A composition as defined in claim 7 in which the polymers of components (1) and (2) have average particle sizes in the range of from 0.03 to 3 microns, their molecular weights are in the range of 100,000 to 10,000,000 and the $T_1$ value of the polymers is not over 25° C.

19. A composition as defined in claim 7 in which the polymer of component (1) has an average particle size in the range from 0.03 to 3 microns, and the polymer of component (2) has an average particle size of at least 0.003 micron and the average particle size of component (2) is at least 30% smaller than the average particle size of component (1).

20. A composition as defined in claim 7 in which the average particle size of the polymer of component (2) is in the range of 0.03 to 0.2 micron.

21. A composition as defined in claim 7 in which the average particle size of the polymer of component (1) is in the range of 0.3 to 3 microns and the average particle size of the polymer of component (2) is in the range of 0.05 to 0.5 micron and is at least 50% smaller than the average particle size of component (1).

22. A water-base paint comprising a composition as defined in claim 7 and comprising a pigment, the ratio of the weight of pigment to the total weight of the polymers of components (1) and (2) being from 20:1 to 1:20.

References Cited

UNITED STATES PATENTS

| | | | |
|---|---|---|---|
| 2,881,155 | 4/1929 | Hankin | 260—29.6 |
| 2,720,496 | 10/1955 | Bushnell | 260—29.6 |
| 2,909,449 | 10/1959 | Banigan | 260—29.6 |
| 3,035,004 | 5/1962 | Glavis | 260—29.6 |

OTHER REFERENCES

Chemical Abstracts, vol. 49, pp. 13,686$i$, and 13,687$a$ (1955).

SAMUEL H. BLECH, *Primary Examiner.*

MURRAY TILLMAN, *Examiner.*

P. LIEBERMAN, *Assistant Examiner.*